US009409565B2

(12) United States Patent
Bureau et al.

(10) Patent No.: US 9,409,565 B2
(45) Date of Patent: Aug. 9, 2016

(54) HYBRID ELECTRIC VEHICLE CONTROL SYSTEM AND METHOD

(71) Applicant: Jaguar Land Rover Limited, Coventry (GB)

(72) Inventors: Baptiste Bureau, Coventry (GB); Clement Dextreit, Conventry (GB); David McGeoch, Coventry (GB)

(73) Assignee: Jaguar Land Rover Limited (GB)

( * ) Notice: Subject to any disclaimer, the term of this patent is extended or adjusted under 35 U.S.C. 154(b) by 0 days.

(21) Appl. No.: 14/650,390

(22) PCT Filed: Dec. 6, 2013

(86) PCT No.: PCT/EP2013/075817
§ 371 (c)(1),
(2) Date: Jun. 8, 2015

(87) PCT Pub. No.: WO2014/090704
PCT Pub. Date: Jun. 19, 2014

(65) Prior Publication Data
US 2015/0307084 A1    Oct. 29, 2015

(30) Foreign Application Priority Data
Dec. 10, 2012   (GB) .................................. 1222175.0

(51) Int. Cl.
*B60W 20/00*    (2016.01)
*B60W 10/08*    (2006.01)
(Continued)

(52) U.S. Cl.
CPC ............ *B60W 20/1088* (2013.01); *B60K 6/442* (2013.01); *B60W 10/06* (2013.01);
(Continued)

(58) Field of Classification Search
CPC ...... B60W 20/00; B60W 20/40; Y10S 903/93
USPC ........................................................... 701/22
See application file for complete search history.

(56) References Cited

U.S. PATENT DOCUMENTS

| 6,048,289 A | 4/2000 | Hattori et al. |
| 6,190,282 B1 * | 2/2001 | Deguchi ................. B60K 6/442 180/65.23 |

(Continued)

FOREIGN PATENT DOCUMENTS

| DE | 10 2006 018 624 A1 | 10/2007 |
| EP | 1 782 988 A1 | 5/2007 |

(Continued)

OTHER PUBLICATIONS

Notice of Reason(s) for Rejection, Japanese Patent Application No. 2015-546034, May 10, 2016, 3 pages.

*Primary Examiner* — Thomas Tarcza
*Assistant Examiner* — Tyler J Lee
(74) *Attorney, Agent, or Firm* — Myers Bigel & Sibley

(57) ABSTRACT

The present invention relates to a control system for a hybrid electric vehicle having an engine (121) and first (123C) and second (123B) electric machines operable as propulsion motors. The second electric machine is arranged to be drivably coupled to the engine, the engine being arranged to be drivably coupled to a driveline of the vehicle by clutch means (122). The system is operable to control the vehicle to operate in one selected from amongst: an engine-driven mode in which the clutch means is closed and the engine applies torque to the driveline of the vehicle; an electric vehicle (EV) mode in which the clutch means is open and the first electric machine applies torque to the driveline; and an EV boost mode in which the clutch means is closed and both the first and second electric machines apply torque to the driveline, the engine being motored by the second electric machine, the mode in which the vehicle is operated being selected by the system in dependence on the value of one or more vehicle parameters.

15 Claims, 2 Drawing Sheets

(51) Int. Cl.
*B60K 6/442* (2007.10)
*B60W 10/06* (2006.01)
*B60K 6/48* (2007.10)

(52) U.S. Cl.
CPC .............. *B60W 10/08* (2013.01); *B60W 20/19* (2016.01); *B60W 20/40* (2013.01); *B60K 2006/4825* (2013.01); *B60W 2540/00* (2013.01); *B60W 2710/0666* (2013.01); *B60W 2710/083* (2013.01); *Y02T 10/6234* (2013.01); *Y02T 10/6247* (2013.01); *Y02T 10/6252* (2013.01); *Y02T 10/7258* (2013.01); *Y02T 10/84* (2013.01); *Y10S 903/93* (2013.01)

(56) References Cited

U.S. PATENT DOCUMENTS

| | | | | |
|---|---|---|---|---|
| 6,722,332 | B2* | 4/2004 | Kojima | B60K 6/365 123/179.3 |
| 6,831,429 | B2* | 12/2004 | Fu | B60K 6/48 318/139 |
| 7,650,956 | B2* | 1/2010 | Hirata | B60K 6/445 180/248 |
| 8,360,929 | B2* | 1/2013 | Beer | B60W 10/02 180/65.28 |
| 8,676,414 | B2* | 3/2014 | Luo | B60K 6/405 701/22 |
| 2006/0276289 | A1* | 12/2006 | Hirata | B60K 6/445 475/5 |
| 2007/0284937 | A1 | 12/2007 | Deiml et al. | |
| 2009/0171522 | A1* | 7/2009 | Luo | B60K 6/405 701/22 |
| 2010/0121512 | A1 | 5/2010 | Takahashi et al. | |
| 2012/0083950 | A1* | 4/2012 | Yang | B60K 6/365 701/22 |

FOREIGN PATENT DOCUMENTS

| | | |
|---|---|---|
| JP | 2010-76678 A | 4/2010 |
| JP | 2010-130862 A | 6/2010 |

* cited by examiner

HYBRID ELECTRIC VEHICLE CONTROL SYSTEM AND METHOD

RELATED APPLICATIONS

This application is a 35 U.S.C. §371 national stage application of PCT Application No. PCT/EP2013/075817, filed on Dec. 6, 2013, which claims priority from Great Britain Patent Application No. 1222175.0, filed on Dec. 10, 2012, the contents of which are incorporated herein by reference in their entireties. The above-referenced PCT International Application was published in the English language as International Publication No. WO 2014/090704 A1 on Jun. 19, 2014.

TECHNICAL FIELD

The present invention relates to a hybrid electric vehicle control system and method. In particular, but not exclusively, embodiments of the invention relate to hybrid electric vehicles operable in a parallel mode. Aspects of the invention relate to a method, to a system and to a vehicle.

BACKGROUND

It is known to provide a hybrid electric vehicle having an internal combustion engine operable to provide drive torque to drive the vehicle and an electrical propulsion motor operable to provide drive torque when the vehicle is operated in an electric vehicle (EV) mode. A vehicle control system determines when to switch the internal combustion engine on or off, and when to open or close a clutch K0 between the engine and a transmission. In some vehicles the electric propulsion motor is integrated into the transmission.

It is also known to provide an electric machine as a starter for cranking the engine when an engine start is required. Known starters include belt-integrated starter/generators. Such devices are operable as electrical generators driven by the engine as well as a starter.

SUMMARY OF THE INVENTION

Embodiments of the invention may be understood with reference to the appended claims.

Aspects of the present invention provide a control system, a vehicle and a method.

In one aspect of the invention for which protection is sought there is provided a control system for a hybrid electric vehicle having an engine and first and second electric machines operable as propulsion motors, wherein the second electric machine is arranged to be drivably coupled to the engine, the engine being arranged to be drivably coupled to a driveline of the vehicle by clutch means, the system being operable to control the vehicle to operate in one selected from amongst:

an engine-driven mode in which the clutch means is closed and the engine applies torque to the driveline of the vehicle;

an electric vehicle (EV) mode in which the clutch means is open and the first electric machine applies torque to the driveline; and an EV boost mode in which the clutch means is closed and both the first and second electric machines apply torque to the driveline, the engine being motored by the second electric machine, the mode in which the vehicle is operated being selected by the system in dependence on the value of one or more vehicle parameters.

Embodiments of the present invention have the advantage that a value of driver-demanded torque at which a vehicle controller must command starting of an engine in order to meet driver demand may be increased. This is because the second electric machine is able to apply drive torque in addition to the first electric machine, thereby providing a 'torque boost' to the driveline. This has the effect of reducing the number of times that an engine must be started when a vehicle is operating in EV mode. Furthermore, an amount of time for which an engine is required to remain switched on following an engine start may be reduced in some circumstances.

It is to be understood that wheels of the vehicle are considered to form part of the driveline. The first electric machine may be located at any suitable location of a driveline. In some embodiments the first electric machine is a crankshaft integrated starter-generator (CIMG). For example the CIMG may be integrated into a transmission of the vehicle. Other arrangements are also useful. For example, the first electric machine may be integrated into a wheel of the vehicle, for example in the form of a wheel hub motor.

The system may be operable to control the vehicle to operate in EV mode when the amount of driver demanded torque does not exceed a prescribed first value and to operate in the EV boost mode when the amount of driver demanded torque exceeds the first value but does not exceed a second prescribed value.

The system may be operable to assume the engine-driven mode when the value of driver demanded torque exceeds the second prescribed value.

Advantageously the system may be operable to calculate a predicted value of driver demanded torque being the amount of torque the driver is likely to demand within a prescribed period of time from the current time.

The system may be operable to calculate the predicted value of driver demanded torque in dependence at least in part on an unfiltered value of driver demanded torque, the system being operable to command a powertrain controller to deliver an amount of driver demanded torque corresponding to a low-pass filtered value of the unfiltered value of driver demanded torque.

The system may be operable to control the vehicle to operate in EV mode when the predicted value of driver demanded torque does not exceed a prescribed first value and to operate in the EV boost mode when the predicted amount of driver demanded torque exceeds the first value but does not exceed the second prescribed value.

The system may be operable to assume the engine-driven mode when the predicted value of driver demanded torque exceeds the second prescribed value.

The system may be operable when in the engine-driven mode to apply torque to the driveline by means of the first electric machine in addition to the engine.

Optionally when in the engine-driven mode the system is operable to apply torque to the driveline by means of the second electric machine in addition to the engine.

The first prescribed value may correspond to a maximum torque that the first electric machine may develop at a given moment in time.

The first prescribed value may correspond to a value greater than or less than the maximum torque that the first electric machine may develop at a given moment in time, optionally greater than or less than the maximum torque by a prescribed amount.

It is to be understood that if the first prescribed value is greater than the maximum torque value, the vehicle will tend to remain in a condition in which torque boost is not provided by the second electric machine, conserving battery state of charge, unless the driver demands a value of torque exceeding the maximum torque the first electric machine may deliver by more than the prescribed amount. In contrast, if the first prescribed value is less than the maximum torque that the first electric machine may deliver, the system will tend to motor the engine with the engine connected to the driveline before the driver torque demand exceeds that which the first electric machine may deliver, increasing a responsiveness of the system to driver torque demand in excess of that which the first electric machine may deliver.

The second prescribed value may correspond to a maximum drive torque that the first and second electric machines may develop at a given moment in time with the engine motoring and connected to the driveline.

The second prescribed value may correspond to a value greater than or less than the maximum torque that the first and second electric machines may develop at a given moment in time with the engine motoring and connected to the driveline, optionally by a prescribed amount.

It is to be understood that if the second prescribed value is greater by a prescribed amount than the maximum torque value that may be delivered in EV boost mode, the vehicle will tend to remain in EV boost mode unless the driver demands a value of torque exceeding the maximum torque that may be delivered in EV boost mode by more than the prescribed amount. This reduces a likelihood of the engine being started, and increases a likelihood the vehicle will remain in EV mode.

In contrast, if the second prescribed value is less by a prescribed amount than the maximum torque that may be delivered in EV boost mode, the vehicle will tend to assume the engine-driven mode before the driver torque demand exceeds the maximum value that may be provided in EV-boost mode, increasing a responsiveness of the system to driver torque demand in excess of that which may be delivered in EV-boost mode.

In some embodiments the system may be operable to set the first and second prescribed values greater than or less than the maximum torque value in dependence on a driver selected driving mode. For example in a mode such as an 'EV Sport' mode the first and second prescribed values may be less than the corresponding maximum torque values in the EV and EV boost modes whilst in an 'EV Drive' or 'EV Eco' mode the first and second prescribed values may be greater than the corresponding maximum torque values in the EV and EV boost modes. Other arrangements are also useful.

In a further aspect of the invention for which protection is sought there is provided a vehicle comprising a system according to the preceding aspect.

In one aspect of the invention for which protection is sought there is provided method of controlling a hybrid electric vehicle having an engine and first and second electric machines operable as propulsion motors, wherein the second electric machine is substantially permanently drivably coupled to the engine and the engine may be drivably coupled to a driveline of the vehicle by clutch means, the method comprising controlling the vehicle to operate in one selected from amongst:

an engine-driven mode in which the clutch means is closed and the engine applies torque to the driveline of the vehicle;

an electric vehicle (EV) mode in which the clutch means is open and the first propulsion motor applies torque to the driveline; and an EV boost mode in which the clutch means is closed and both the first and second electric machines apply torque to the driveline, the engine being motored by the second electric machine, whereby the mode in which the vehicle is controlled to operate is selected in dependence on the value of one or more vehicle parameters.

In an aspect of the invention for which protection is sought there is provided a control system for a hybrid electric vehicle having an engine and first and second electric machines operable as propulsion motors, wherein the second motor is substantially permanently drivably coupled to the engine and the engine may be drivably coupled to a driveline of the vehicle by clutch means, the system being operable to control the vehicle to operate in: a parallel mode in which the clutch means is closed and the engine and the first electric machine apply torque to the driveline of the vehicle; an electric vehicle (EV) mode in which the clutch means is open and the first propulsion motor applies torque to the driveline; and an EV boost mode in which the clutch means is closed and both the first and second electric machines apply torque to the driveline.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described with reference to one embodiment are applicable to all embodiments, unless such features are incompatible.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

One or more embodiments of the invention will now be described, by way of example only, with reference to the accompanying figures in which.

DETAILED DESCRIPTION

Figure 1:
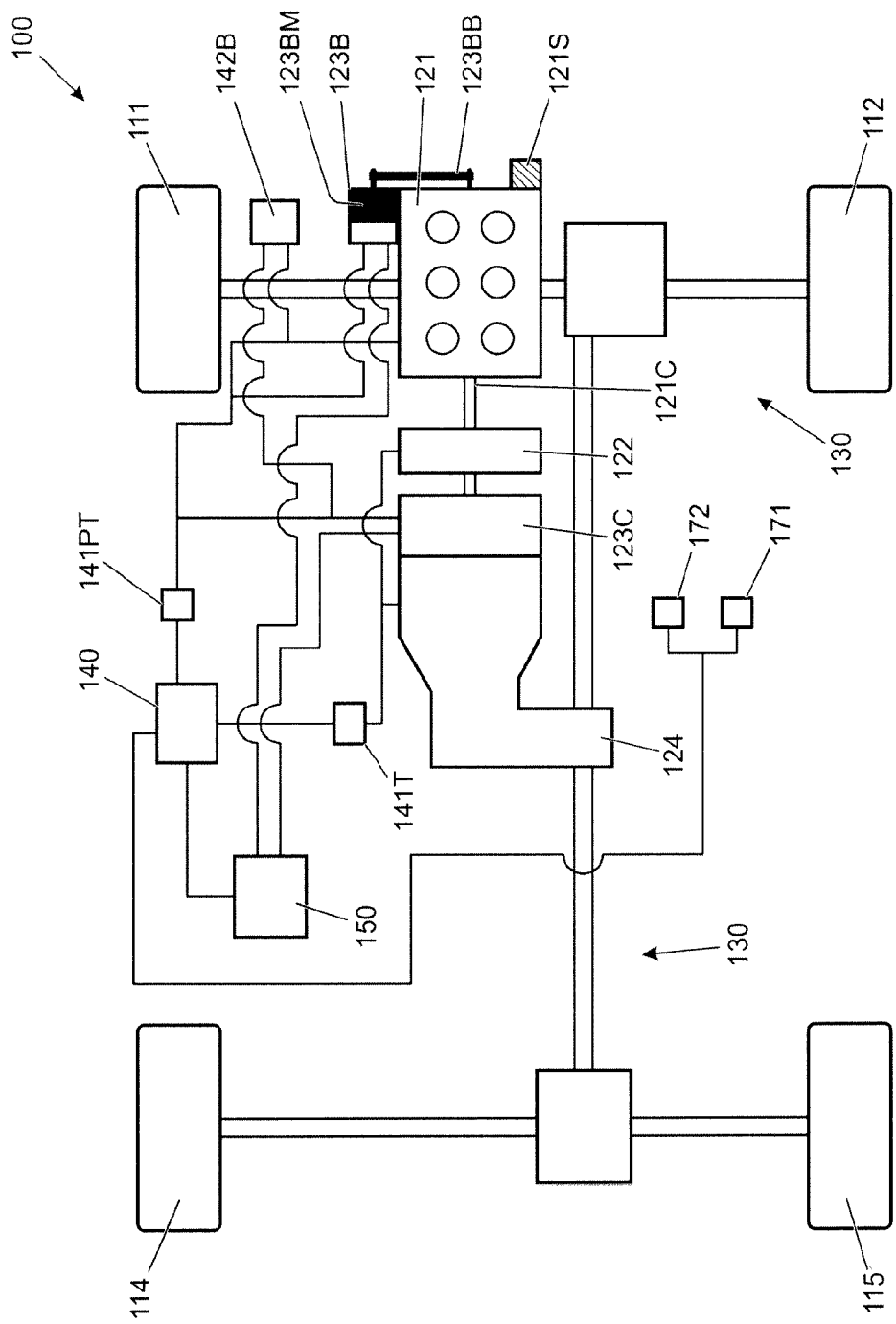
FIG. 1 is a schematic illustration of a hybrid electric vehicle according to an embodiment of the present invention.

In one embodiment of the invention a plug-in hybrid electric vehicle 100 is provided as shown in FIG. 1. The vehicle 100 has an engine 121 coupled to a belt integrated starter generator (BISG) 123B. The BISG 123 may also be referred to as a belt integrated (or belt mounted) motor generator. The BISG 123 is coupled in turn to a crankshaft-integrated starter/generator (CIMG) 123C by means of a clutch 122. The clutch 122 may also be referred to as a $K_0$ clutch 122.

The CIMG 123C is integrated into a housing of a transmission 124 which is in turn coupled to a driveline 130 of the vehicle 100 thereby to drive a pair of front wheels 111, 112 and a pair of rear wheels 114, 115 of the vehicle 100.

It is to be understood that other arrangements are also useful. For example the driveline 130 may be arranged to drive the pair of front wheels 111, 112 only or the pair of rear wheels 114, 115 only, or to be switchable between a two wheel drive mode in which the front or rear wheels only are driven and a four wheel drive mode in which the front and rear wheels are driven.

The BISG 123B and CIMG 123C are arranged to be electrically coupled to a charge storage module 150 having a battery and an inverter. The module 150 is operable to supply the BISG 123B and/or CIMG 123C with electrical power when one or both are operated as propulsion motors. Similarly, the module 150 may receive and store electrical power generated by the BISG 123B and/or CIMG 123C when one or both are operated as electrical generators. In some embodiments, the CIMG 123C and BISG 123B may be configured to generate different potentials to one another. Accordingly, in some embodiments each is connected to a respective inverter adapted to operate at the corresponding potential of the CIMG 123C or BISG 123B. Each inverter may have a respective battery associated therewith. In some alternative embodiments the CIMG 123C and BISG 123B may be coupled to a single inverter which is adapted to receive charge from the CIMG 123C and BISG 123B at the respective potentials and to store the charge in a single battery. Other arrangements are also useful.

The BISG 123B has an electric machine 123BM that is drivably coupled to a crankshaft 121C of the engine 121 by means of a belt 123BB. The BISG 123B is operable to provide torque to the crankshaft 121C when it is required to start the engine 121 or when it is required to provide torque-assist to the driveline 130 as discussed in further detail below.

The vehicle 100 has a vehicle controller 140 operable to command a powertrain controller 141 PT to control the engine 121 to switch on or off and to generate a required amount of torque. The vehicle controller 140 is also operable to command the powertrain controller 141 PT to control the BISG 123B to apply a required value of positive or negative torque (operating as a propulsion motor or a generator) to the engine 121. Similarly, the vehicle controller 140 may command the CIMG 123C to apply a required value of positive or negative torque (again operating as a propulsion motor or a generator) to the driveline 130 via the transmission 124.

The vehicle has an accelerator pedal 171 and a brake pedal 172. The accelerator pedal 171 provides an output signal to the vehicle controller 140 indicative of an amount by which the pedal 171 is depressed. The vehicle controller 140 is arranged to determine the amount of driver demanded torque based on the accelerator pedal position and one or more other vehicle parameters including engine speed W.

The vehicle 100 of FIG. 1 is operable by the vehicle controller 140 in an electric vehicle (EV) mode in which the clutch 122 is open and the crankshaft 121C is stationary. In EV mode the CIMG 123C is operable to apply positive or negative torque to the driveline 130 via the transmission 124. Negative torque may be applied for example when regenerative braking is required under the control of a brake controller 142B.

The vehicle 100 is also operable in a parallel mode in which the engine 121 is switched on and the clutch 122 is closed. In the parallel mode the CIMG 123C may be operated as a motor to provide torque-assist or 'torque boost' to the driveline 130 in addition to that provided by the engine 121 or as a generator to recharge the charge storage module 150.

Optionally, the BISG 123B may be operable to provide torque boost in addition to or instead of the CIMG 123C when the vehicle 100 is operating in the parallel mode.

The vehicle controller 140 is configured to anticipate increases in driver demanded torque by monitoring an unfiltered or 'raw' value of driver demanded torque (TQDDraw). It is to be understood that vehicle controller 140 determines a value of driver demanded torque in dependence on the position of the accelerator pedal 172. The value TQDDraw is input to a low-pass filter, an output value of which (TQDDfil) is fed to the powertrain controller 141PT. The value of driver demanded torque fed to the powertrain controller 141PT (TQDDfil) may therefore lag behind the raw value TQDDraw. The vehicle controller 140 is able to anticipate an increase in driver demanded torque to be received by the powertrain 141PT by monitoring the value of TQDDraw.

In the present embodiment, if the controller 140 determines that value of TQDDraw or TQDDfil exceeds a prescribed CIMG maximum allowable torque value EVMAXTQ1 the controller 140 prepares to control the vehicle 100 to provide torque boost to the driveline 130 by means of the BISG 123B. The controller 140 does this by commanding the powertrain controller 141 PT to control the BISG 123B to spin up the engine 121 to a speed W substantially matching that of the CIMG 123C and to close the clutch 122. Once the clutch 122 is closed, the vehicle controller 140 may command the powertrain controller 141 PT to meet by means of the BISG 123B any shortfall in driver demanded torque that the CIMG 123C is unable to fulfil.

It is to be understood that the controller 140 may be operable to command motoring of the engine 121 and closure of the clutch 122 without starting the engine 121 if the value of TQDDraw or TQDDfil exceeds a threshold value which may be greater than EVMAXTQ1 by a prescribed amount (thereby reducing responsiveness of the vehicle powertrain to driver torque demand) or less than EVMAXTQ1 by a prescribed amount (thereby potentially increasing responsiveness of the powertrain to torque demand).

In the present embodiment the value of EVMAXTQ1 is determined by the controller 140 according to an algorithm that is dependent on the maximum torque achievable by the CIMG 123C, a current state of charge (SoC) of the charge storage module 150, a driving mode in which the transmission is operating (such as 'sport mode' or 'drive mode'), and data in respect of driver historical behaviour. By driver historical behaviour is meant data in respect of vehicle speed and driver demanded torque at least, over a historical period. It is to be understood that the value of EVMAXTQ1 may change in real time and be arranged to represent a trade-off between overall powertrain efficiency, response time and refinement.

It is to be understood that the BISG 123B is required to generate a certain amount of torque in order to overcome frictional and other losses associated with motoring of the engine 121 before a net positive drive torque may be applied to the driveline 130 by the BISG 123B/engine 121 combination. Thus a certain amount of energy is lost in motoring the engine 121. However, it is to be understood that benefits may be enjoyed by avoiding or at least delaying starting of the engine 121 when operating in EV mode by supplementing CIMG 123C torque with torque generated by the BISG 123B. For example, an amount of undesirable gases emitted by the vehicle including carbon dioxide may be reduced by delaying starting of the engine 121. In some circumstances an amount of sound generated by the vehicle 100 may be reduced by delaying the engine start whilst allowing driver torque demand to be met.

The maximum amount of drive torque that may be provided by the CIMG 123C and BISG 123B with the clutch 122 closed and the engine 121 motoring is given by parameter EVMAXTQ2. In the present embodiment the value of EVMAXTQ2 is determined by the controller 140 according to an algorithm that is dependent on the respective temperatures of the CIMG 123C and BISG 123B and a state of charge (SoC) of the charge storage module 150.

The vehicle controller 140 monitors driver the value of TQDDraw and TQDDfil substantially continually. If the controller 140 determines that the value of TQDDraw or TQD- Dfil exceeds EVMAXTQ2, the controller 140 commands the powertrain controller 141 PT to fuel the engine and deliver drive torque to the driveline 130 by means of the engine 121. In the embodiment of FIG. 1 the engine 121 is an internal combustion engine operable to burn diesel oil according to the conventional diesel combustion cycle. It is to be understood that when the engine 121 is motored without starting, fuel to the engine 121 is cut off. In order to deliver drive torque the powertrain controller 141 PT controls the engine 121 such that fuel is supplied to the engine 121.

It is to be understood that in an alternative embodiment the controller 140 may configured to trigger starting of the engine 121 if the value of TQDDraw or TQDDfil exceeds a threshold value that is greater than EVMAXTQ2 by a prescribed amount or a threshold value that is less than EVMAXTQ2 by a prescribed amount. It is to be understood that the threshold values of TQDDraw or TQDDfil above which the engine 121 is motored with the clutch 122 closed and the threshold values of TQDDraw or TQDDfil above which the engine 121 is fuelled may be different. In an embodiment the threshold value of TQDDfil is offset above EVMAXTQ1 and/or EVMAXTQ2 by a value of around 30 Nm and the threshold value of TQDDraw is offset above EVMAXTQ1 and/or EVMAXTQ2 by a value of around 50 Nm. Other values are also useful.

Embodiments of the present invention may be used with any suitable engine type such as petrol-burning internal combustion engines or any other suitable engines and fuel types. In the case of a petrol engine, in order to apply positive drive torque to the driveline 130 the engine 121 may require spark ignition as well as a fuel supply to be restored.

The vehicle 100 of FIG. 1 is a plug-in hybrid electric vehicle, by which is meant that the vehicle 100 may be connected to an external electrical supply in order to recharge the battery of the charge storage module 150. However, embodiments of the present invention are also suitable for use with non plug-in hybrid electric vehicles.

Figure 2:
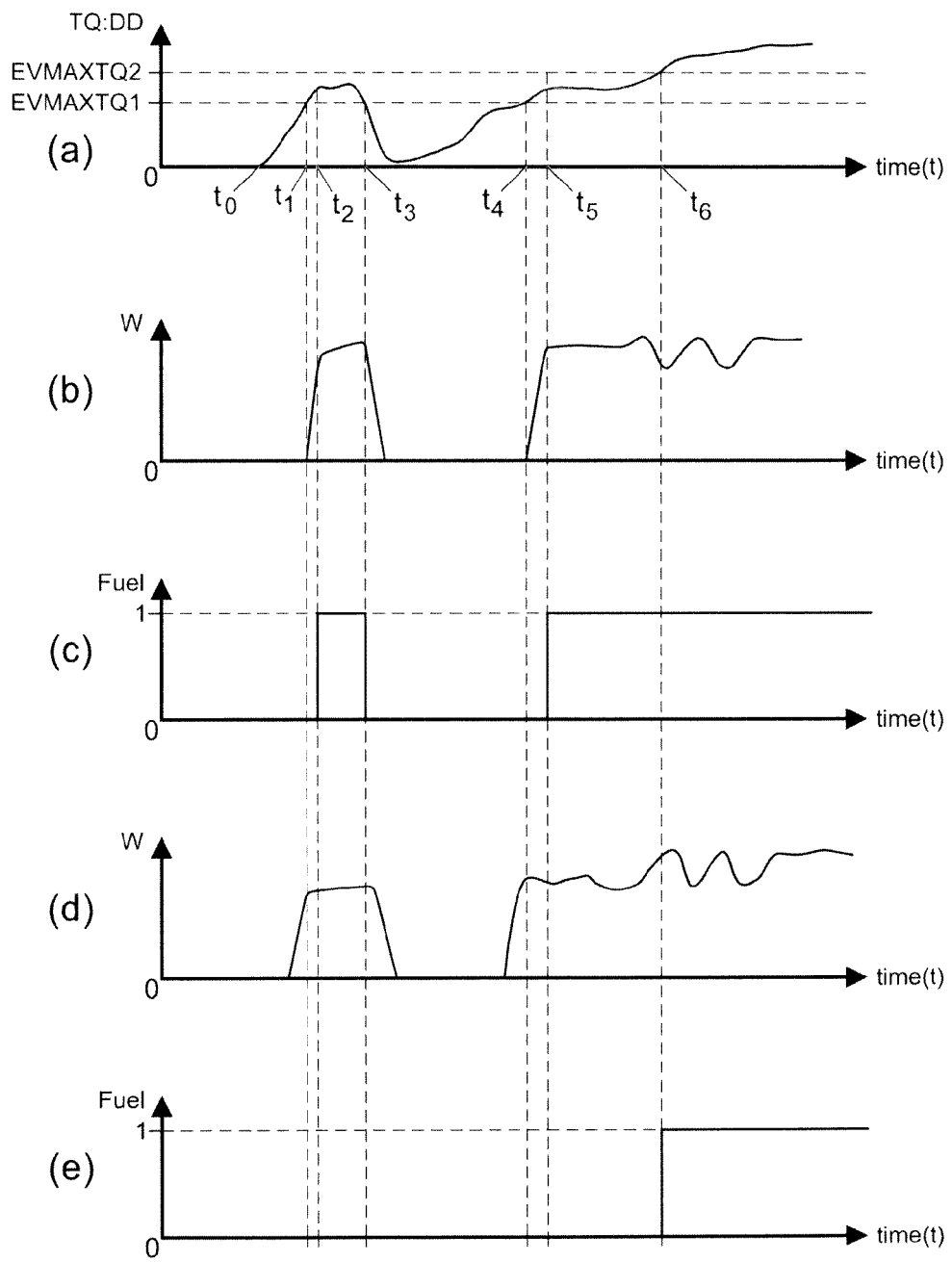
FIG. 2 illustrates operation of a vehicle according to an embodiment of the present invention.

In order to illustrate operation of the vehicle 100 of FIG. 1, we consider a journey made by the vehicle 100 in which the amount of torque demanded by the driver varies over a wide range of values. FIG. 2(*a*) is a plot of driver demanded torque TQ_DD as a function of time during the journey. Shown on the plot are the values of EVMAXTQ1 and EVMAXTQ2. Whilst the values are shown to be substantially constant throughout the journey, it is to be understood that the values may fluctuate in dependence on one or more vehicle parameters as described above.

The operation of the vehicle 100 over the course of the journey depicted will first be described for the case where the BISG 123B is not employed to provide additional torque boost when the vehicle 100 is operating in EV mode. In addition, the controller 140 only commands a transition to parallel mode when the value of TQ_DD exceeds EVMAXTQ1.

FIG. 2(*b*) is a plot of engine speed W as a function of time over the period depicted in FIG. 2(*a*) and FIG. 2(*c*) is a corresponding plot of engine fuel flow status as a function of time. A status of 0 indicates no fuel is supplied, whilst a status of 1 indicates that fuel supply is restored. It can be seen that after the journey commences at time t0, the value of TQ_DD remains below EVMAXTQ1 until time t1 when the value of TQ_DD exceeds EVMAXTQ1. Prior to time t1 fuel is not supplied to the engine 121 and the clutch 122 remains open. At time t1 the controller 140 commands the powertrain controller 141 PT to start the engine 121. The BISG 123B is employed to spin up the engine 121 to a speed matching that of the CIMG 123C. When the speeds of the CIMG 123C and engine 121 are substantially equal, at time t2, the controller 140 commands the supply of fuel to the engine 121 to be restored and the clutch 122 is closed.

At time t3 the value of TQ_DD falls below EVMAXTQ1. Since the CIMG 123C is able to meet this demand without the assistance of the engine 121 the controller 140 commands the powertrain controller 141 PT to switch off the engine 121. This is accomplished by terminating supply of fuel to the engine 121. In some embodiments switching off of the engine 121 may be delayed in order to reduce a risk of mode chattering in which the engine 121 is repeatedly switched on and off in relatively rapid succession. Hysteresis may also be introduced in respect of the value of TQ_DD above which the engine 121 is switched on and the value of TQ_DD below which the engine 121 is switched off.

Subsequently, at time t4, the value of TQ_DD again exceeds EVMAXTQ1 and the controller 140 commands starting of the engine 121 so that the vehicle can assume the parallel mode. Therefore at time t4 the BISG 123B commences rotation of the crankshaft 121C of the engine 121 and at time t5, when engine speed W matches CIMG speed, supply of fuel to the engine 121 is restored and the clutch 122 is closed. The powertrain controller 141PT then controls the engine 121 and CIMG 123C to satisfy the driver demanded torque request TQ_DD.

As described above, embodiments of the present invention enable the BISG 123B to supplement the torque applied to the driveline 130 by the CIMG 123C without fuelling the engine 121, thereby reducing the amount of fuel consumed by the engine 121 and the amount of emissions generated. Operation of the vehicle 100 over the course of the journey depicted in FIG. 2(*a*) will therefore now be described with reference to FIG. 2(*d*) and FIG. 2(*e*) in which the BISG 123B is employed to provide drive torque to boost that provided by the CIMG 123C in EV mode.

FIG. 2(*d*) is a plot of engine speed W as a function of time over the period depicted in FIG. 2(*a*) and FIG. 2(*e*) is a corresponding plot of engine fuel flow status as a function of time. As described above, at time t1 the value of TQ_DD exceeds EVMAXTQ1 for the first time. However, the vehicle controller 140, which monitors rate of depression of throttle pedal 171, determines prior to time t1 that TQ_DD is likely to exceed EVMAXTQ1. When the determination is made, prior to t1, the vehicle controller 140 commands the BISG 123B to spin up the engine 121 to a speed matching that of the CIMG 123C. At or around time t1 the controller commands closure of the clutch 122 to connect the engine 121 to the CIMG 123C. The BISG 123B then delivers drive torque to the CIMG 123C to supplement that developed by the CIMG 123C itself and meet the driver demanded value TQ_DD. As shown in FIG. 2(*e*) the supply of fuel to the engine 121 is not restored, and the engine 121 is motored by the BISG 123B.

At time t3 the value of TQ_DD falls below EVMAXTQ1. The controller 140 therefore commands the clutch 122 to be opened and the BISG 123B is switched off causing the crankshaft speed 123C to fall to zero.

Subsequently, at time t4 the value of TQ_DD again increases above EVMAXTQ1. The vehicle controller 140 anticipates this increase and at a time prior to t4 commences motoring of the engine 121. At time t4 the engine speed W has increased to a value corresponding to that of the CIMG 123C and the controller 140 commands closure of clutch 122. The BISG 123B is again controlled to supplement the torque delivered to the driveline 130 by the CIMG 123C in order to meet driver demand TQ_DD.

At time t6 the value of TQ_DD exceeds EVMAXTQ2, requiring the engine 121 to at least supplement the torque developed by the CIMG 123C and BISG 123B. The vehicle controller 140 therefore commands fuel to be supplied to the engine 121 as indicated in FIG. 2(*e*). The engine 121 is then able to deliver drive torque to satisfy the value of TQ_DD.

It is to be understood that the amount of torque applied to the driveline 130 by the engine 121 may be blended with the amount applied by the BISG 123B and CIMG 123C in order to reduce excessive deviation of the net torque applied to the driveline by the CIMG 123C, BISG 123B and engine 121 from the value of TQ_DD as the proportion of TQ_DD that is provided by the engine 121 increases. That is, the amount of torque applied by one or both of the electric machines 123B, 123C may gradually be reduced as the amount of torque applied by the engine 121 increases, rather than abruptly stopping the application of torque by one or both of the electric machines 123B, 123C and abruptly applying torque by means of the engine 121.

By torque-assist is meant that the BISG 123 can provide additional torque to the driveline of the vehicle 100 via the transmission 124. When the vehicle is operating in EV mode, this allows a larger amount of torque to be applied to the driveline 130 without starting the engine 121. When operating in the parallel mode, this allows the amount of torque that is required to be developed by the engine 121 to be reduced. This feature may be employed to reduce fuel consumption and/or $CO_2$ emissions.

Furthermore in some embodiments this allows an engine 121 with reduced maximum torque capability to be used for a given amount of maximum required torque thereby allowing a smaller and more efficient engine 121 to be employed.

In some embodiments of the invention the vehicle controller 140 may be operable to control the vehicle 100 to operate in an EV 'range extender' mode in which the engine 121 drives the BISG 123B as a generator with the clutch 122 open. The BISG 123B is thereby able to generate charge to charge the charge storage module 150 whilst the CIMG 123C applies drive torque to the driveline 130.

Embodiments of the invention have the advantage that a transition from an EV mode to the parallel mode may be made in a manner that is faster and more smooth. The transition may be substantially seamless to a user. This is at least in part because when the transition to the parallel mode is made, the engine 121 is typically already spinning and is connected to the driveline 130. Thus in order to assume parallel mode there is no requirement to spin up the engine 121 and no requirement to close the clutch 122 since it is already closed.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A control system for a hybrid electric vehicle having an engine and first and second electric machines operable as propulsion motors, wherein the second electric machine is arranged to be drivably coupled to the engine, the engine being arranged to be drivably coupled to a driveline of the vehicle by a clutch, the system being operable to control the vehicle to operate in the following modes:
   an engine-driven mode in which the clutch is closed and the engine applies torque to the driveline of the vehicle;
   an electric vehicle (EV) mode in which the clutch is open, the first electric machine applies torque to the driveline, and neither the engine nor the second electric machine applies torque to the driveline; and
   an EV boost mode in which the clutch is closed and both the first and second electric machines apply torque to the driveline without fuelling the engine, wherein the second electric machine is coupled to a crankshaft of the engine and motors the engine,
   wherein each mode is selected by the system in dependence on a value of one or more vehicle parameters.

2. The system of claim 1, further operable to control the vehicle to operate in the EV mode when an amount of driver demanded torque does not exceed a first prescribed value and to operate in the EV boost mode when the amount of driver demanded torque exceeds the first value but does not exceed a second prescribed value.

3. The system of claim 2, further operable to assume the engine-driven mode when the value of driver demanded torque exceeds the second prescribed value.

4. The system of claim 2, further operable to assume the engine-driven mode when the predicted value of driver demanded torque exceeds the second prescribed value.

5. The system of claim 2, wherein the first prescribed value corresponds to a maximum torque that the first electric machine may develop at a given moment in time.

6. The system of claim 2, wherein the first prescribed value corresponds to a value greater than or less than a maximum torque that the first electric machine may develop at a given moment in time.

7. The system of claim 2, wherein the second prescribed value corresponds to a maximum drive torque that the first and second electric machines may develop at a given moment in time with the engine motoring and connected to the driveline.

8. The system of claim 2, wherein the second prescribed value corresponds to a value greater than or less than a maximum torque that the first and second electric machines may develop at a given moment in time with the engine motoring and connected to the driveline.

9. The system of claim 1, further operable to calculate a predicted value of driver demanded torque that a driver is likely to demand within a prescribed period of time from a current time.

10. The system of claim 9, further operable to calculate the predicted value of driver demanded torque in dependence at least in part on an unfiltered value of driver demanded torque, the system being operable to command a powertrain controller to deliver an amount of driver demanded torque corresponding to a low-pass filtered value of the unfiltered value of driver demanded torque.

11. The system of claim 9, further operable to control the vehicle to operate in the EV mode when the predicted value of driver demanded torque does not exceed a prescribed first value and to operate in the EV boost mode when the predicted amount of driver demanded torque exceeds the first value but does not exceed the second prescribed value.

12. The system of claim 1, wherein, when in the engine-driven mode, the system is operable to apply torque to the driveline via the first electric machine in addition to the engine.

13. The system of claim 1, wherein, when in the engine-driven mode, the system is operable to apply torque to the driveline via the second electric machine in addition to the engine.

14. A vehicle comprising the control system of claim 1.

15. A method of controlling a hybrid electric vehicle having an engine and first and second electric machines operable as propulsion motors, wherein the second electric machine is substantially permanently drivably coupled to the engine and the engine may be drivably coupled to a driveline of the vehicle by a clutch, the method comprising controlling the vehicle to operate in the following modes:

an engine-driven mode in which the clutch is closed and the engine applies torque to the driveline of the vehicle;

an electric vehicle (EV) mode in which the clutch is open, the first electric machine applies torque to the driveline, and neither the engine nor the second electric machine applies torque to the driveline; and an EV boost mode in which the clutch is closed and both the first and second electric machines apply torque to the driveline without fuelling the engine, wherein the second electric machine is coupled to a crankshaft of the engine and motors the engine, whereby each mode is selected in dependence on a value of one or more vehicle parameters.

* * * * *